Patented Sept. 5, 1944

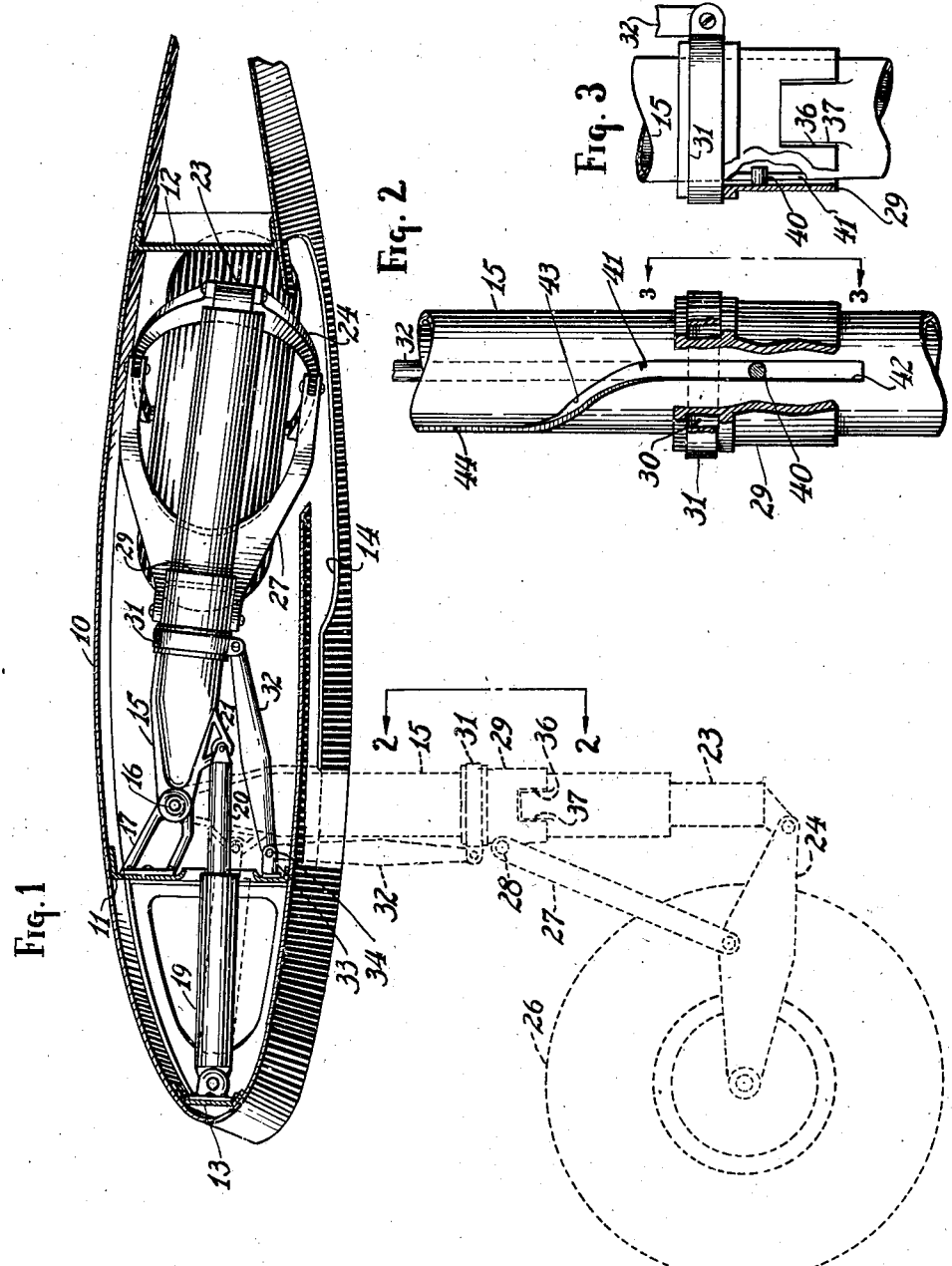

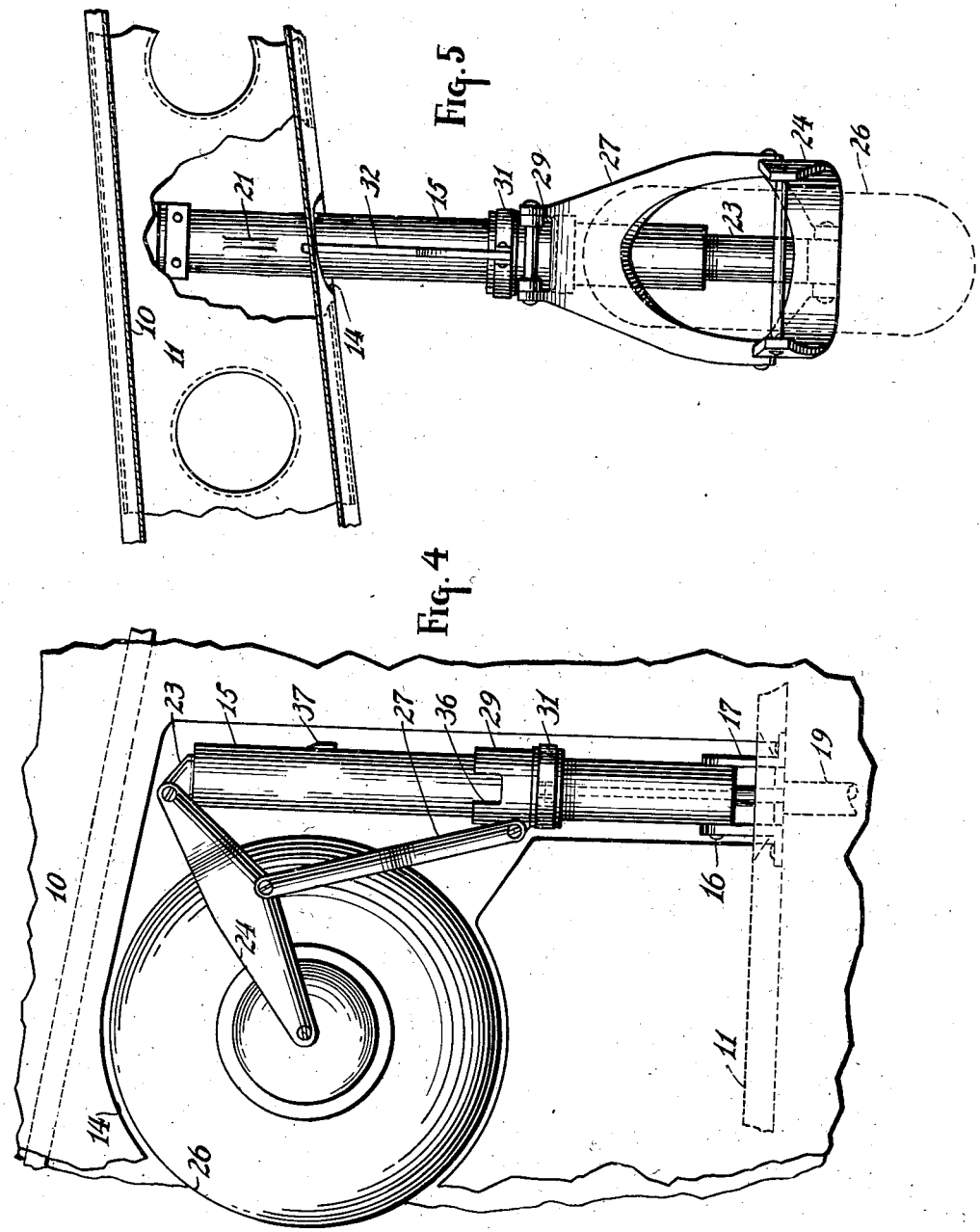

2,357,489

UNITED STATES PATENT OFFICE 2,357,489

RETRACTABLE LANDING GEAR

I. Nevin Palley and Frank Erny, Kenmore, N. Y., assignors to Curtiss-Wright Corporation, a corporation of Delaware Application April 9, 1941, Serial No. 387,616

13 Claims. (Cl. 244—102)

This invention relates to retractable landing gears for aircraft and is particularly concerned with a landing gear adapted, when retracted, to be housed within a relatively thin wing, and adapted when extended to lie below the wing with the wheel of the landing gear disposed in a forward position substantially beneath the leading edge of the wing.

An object of the invention is to provide a landing gear arrangement wherein the wheel when extended lies in a vertical fore-and-aft plane, and when retracted, lies in a substantially horizontal plane. A further object of the invention is to provide a landing gear which may be compactly folded within the wing, to occupy a space substantially less than that which it occupies when extended. A further object is to provide means to turn the landing gear from a vertical plane into a horizontal plane when moved from extended to retracted positions. Still another object is to provide a landing gear in which a tension type shock absorber strut may be used in place of the usual compression type shock absorber.

Further objects of the invention will become apparent in reading the detailed description below in connection with the drawings, in which:

Fig. 1 is a section through an aircraft wing showing the landing gear retracted, and showing the extended landing gear in dotted lines;

Fig. 2 is an enlarged view of part of the landing gear on the line 2—2 of Fig. 1;

Fig. 3 is a detail of the landing gear on the line 3—3 of Fig. 2;

Fig. 4 is a bottom view of the landing gear retracted within a wing; and

Fig. 5 is a front elevation of the landing gear, extended, showing a fragment of the wing in section.

In Figs. 1, 4, and 5, 10 designates an aircraft wing having front and rear spars 11 and 12 respectively, and having a false spar 13 adjacent the wing leading edge. The lower surface of the wing, between the spars 11 and 12, is provided with a cutout 14 through which the landing gear is extended and retracted. A main strut 15 is hinged at one end, at 16, to a bracket 17 secured to the front spar 11, and the strut 15 may swing about its hinge 16 between a substantially vertical extended position and a substantially horizontal retracted position, as shown in Fig. 1. Swinging of the strut 15 is afforded by a telescoping hydraulic motor comprising a cylinder 19 pivoted to the false spar 13 within which is slidable a plunger 20 pivoted to a fitting 21 near the end of the strut 15. By selective admission of pressure fluid, in a manner well known in the art, to either end of the cylinder 19, extension and retraction of the strut 15 is accomplished.

The lower end of the strut 15 houses a tension shock absorber, not shown in detail, one element of the shock absorber comprising a plunger 23 telescoping into the bottom of the strut 15. The bottom of the plunger 23 pivotally carries a fork or truck 24 which, when the landing gear is extended, extends forwardly of the strut 15 in a substantially horizontal position. The truck 24 at its forward end carries a landing wheel 26 while midway of the length of the truck 24, the lower end of a link 27 is pivoted, the upper end of said link being pivoted at 28 to a sleeve 29 embracing the strut 15. The sleeve is formed with a groove 30 engaged by a collar 31 whereby the collar and sleeve are constrained to joint axial movement but may move rotationally with respect to one another. A secondary compression strut 32 is pivoted at one end to the collar 31 and at its other end to a fitting 33 secured to the wing spar 11, the pivot 34 thereof being spaced below and forward of the main strut pivot 16. The sleeve 29 is cut out as at 36, this cutout being engaged by a lug 37 on the strut 15 when the landing gear is extended to lock the strut 15 and the sleeve 29 from relative rotation.

In the extended position, landing forces imposed on the wheel are transmitted through the truck 24 as compression stresses through the link 27 and the strut 32 to the fitting 33. The truck 24 tends to pivot about the lower end of the link 27 thereby imposing tension force upon the plunger 23 which is offset by the tension shock absorber lying within the lower end of the strut 15. It will be seen that the wheel 26 lies a substantial distance forward of the main landing gear hinge 16 and, since the center of gravity of the aircraft is usually approximately 35% of the wing chord from the leading edge, the forward disposition of the wheel 26 will tend to minimize nosing over tendencies of the aircraft upon landing. Retraction of the landing gear, as above noted, is accomplished by extending the hydraulic motor 19, 20 whereby the strut 15 is moved rearwardly and upwardly. During such motion, the strut 32 slides the collar 31 and sleeve 29 upwardly along the strut 15, concurrently lifting the wheel 26 and allowing the plunger 23 to telescope into the strut 15, thereby making the landing gear much more compact when it is retracted, than when it is extended.

The compact position of the landing gear is shown in Fig. 4. The elements 26, 27 and 24 are turned about the strut 15 during retraction by means of a pin 40 on the sleeve 29 which engages with a slot 41 formed in the surface of the strut 15. This slot 41 has a lower portion 42 substantially parallel to the strut axis, the central portion 43 of the slot making a gradual substantially 90° turn around the circumference of the strut 15 whence the slot becomes parallel to the axis of the strut 15 again in a portion 44. Although the slot portions 42 and 44 are parallel, it is apparent that they are spaced 90° apart. Accordingly, during landing gear retraction, the sleeve 29 is rotated through 90° by which the wheel and its adjacent elements 24 and 27 are turned into the plane of the wing as shown in full lines in Fig. 1. The elements 15, 32 and 31 always move in a fore-and-aft plane whereas the elements 29, 23, 27, 24, and 26 not only swing in a fore-and-aft direction but are rotated bodily about the strut 15 through a pin and slot connection.

It will be appreciated that during the first stage of rearward swinging of the strut 15, the sleeve 29 will slide straight up on the strut until the cutout 36 is disengaged from the lug 37, after which turning of the sleeve upon the strut is effected. When the landing gear is fully extended, engagement of the lug 37 within the cutout 36 prevents lateral swinging of the wheel 26 from a true fore and aft plane.

Although a rearward swing of substantially 90° has been indicated for the main landing gear strut 15, and although a turning swing of 90° has been indicated for the wheel and its associated parts, it will be appreciated that swinging movements may be somewhat greater or less than 90° depending upon the particular proportions of the wing and component elements of the landing gear. By compacting the landing gear in its retracted position, it is apparent that the gear may be stowed in a comparatively short fore-and-aft space in the wing, as indicated in Fig. 4, whereas when extended, the projection of the landing gear below the wing may be considerable which characteristic is desirable to afford as much clearance as is possible between the aircraft and the ground to allow of large propeller clearance with respect to the ground. A landing gear of the character disclosed is particularly well adapted for comparatively small high speed aircraft but obviously its utility is not limited to such airplanes.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft retractable landing gear, a strut swingable on a lateral axis between an extended downward position and a retracted substantially horizontal position, a collar embracing said strut, swingable therewith and with respect thereto, a strut pivoted to said collar and to the aircraft so as to effect sliding of the collar on the strut during movements of the latter, a sleeve rotatable with respect to but slidable with the collar, a cam connection between the sleeve and strut to effect relative rotation therebetween upon relative sliding thereof, and a wheel carrier secured to the sleeve for movement therewith.

2. In an aircraft retractable landing gear, a strut swingable in a fore and aft plane, a sleeve embracing the strut, a link pivoted to the sleeve, a wheel carrying truck pivoted to the link and strut, the strut pivot thereof including means to provide freedom of swing of the truck about the strut axis, a cam connection between the sleeve and strut to effect rotation of the sleeve on the strut upon relative translation therebetween, and means to effect said translation.

3. In an aircraft retractable landing gear, a strut swingable in a fore and aft plane, a sleeve embracing the strut, a link pivoted to the sleeve, a wheel carrying truck pivoted to the link and strut, the strut pivot thereof including means to provide freedom of swing of the truck about the strut axis, a cam connection between the sleeve and strut to effect rotation of the sleeve on the strut upon relative translation therebetween, and means responsive to strut swinging to effect said relative translation.

4. In an aircraft retractable landing gear, a strut swingable in a fore and aft plane, a sleeve embracing the strut, a link pivoted to the sleeve, a wheel carrying truck pivoted to the link and strut, the strut pivot thereof including means to provide freedom of swing of the truck about the strut axis, a cam connection between the sleeve and strut to effect rotation of the sleeve on the strut upon relative translation therebetween, and means responsive to strut swinging to effect said relative translation comprising a tie member articulated to the sleeve and pivoted to the aircraft at a point spaced from the strut pivot.

5. In an aircraft retractable landing gear, a strut hinged to the aircraft to lie in a substantially vertical position when the landing gear is extended and to lie in a substantially horizontal position when the landing gear is retracted, a wheel carrying truck articulated to and projecting forwardly from the strut when the landing gear is extended, means to turn the truck sideways into a horizontal plane in response to landing gear retraction said means comprising a sleeve guided for rotation and translation on the strut to which said truck is linked, and means connecting the sleeve to said aircraft at a point on the latter spaced from the strut hinge.

6. In an aircraft retractable landing gear, a strut hinged to the aircraft for vertical extension therebelow, a wheel carrying fork articulated to the lower end of the strut mounted for rotation about the strut axis and extending normally in a fore and aft direction therefrom, a link pivoted to said fork and extending upwardly toward a mid portion of the strut, a sleeve embracing and rotatable on the strut to which said link is pivoted, and a second link pivotally secured to said sleeve and to a part of the aircraft remote from the first strut hinge.

7. In an aircraft retractable landing gear, a strut hinged to the aircraft for vertical extension therebelow, a wheel carrying fork articulated to the lower end of the strut and extending in a fore-and-aft direction therefrom, a link pivoted to said fork and extending upwardly toward a mid portion of the strut, a sleeve embracing the strut to which said link is pivoted, a collar embracing said sleeve for axial movement therewith and for rotation relative thereto, a second strut pivoted at its ends to said collar and to a part of the aircraft spaced from the first strut hinge, means to swing the first strut about its hinge for extending and retracting the landing gear, said sleeve, through said second strut being moved axially along the first strut during swinging thereof, and a cam and cam follower connection between the sleeve and first strut to enforce sleeve turning during its translation along the first strut whereby the link and wheel carrying fork are moved laterally on the first strut to lie in a substantially horizontal plane when the landing gear is retracted.

8. In an aircraft retractable landing gear, a first member hinged to the aircraft swingable between an extended and a retracted position, a second member hinged to the aircraft at a point spaced from the first member hinge, means for slidingly connecting the second member to the first member, and a wheel truck hinged to the first member and connected to the second member through its connecting means, whereby the wheel truck will be hinged by virtue of the relative movement effected between the two members when they are swung from one position to another position.

9. In an aircraft retractable landing gear, a first member hinged to the aircraft swingable between an extended and a retracted position, a second member hinged to the aircraft at a point spaced from the first member hinge, means for slidingly and rotatively connecting the first member with the second member, a wheel truck hinged to the first member and connected to the second member through its connecting means, and means to rotate the first member relative to the second member in response to relative sliding therebetween, whereby said wheel truck will be moved vertically and laterally upon the members being swung from one position to another position.

10. In an aircraft retractable landing gear, a pair of depending struts hinged at their upper ends to spaced apart points on the aircraft, a sleeve slidable on one strut articulated to the lower end of the other strut, means operable to move said struts between extended and retracted positions, and a landing wheel truck articulated at spaced apart points to said sleeve and to the strut embraced by said sleeve.

11. In an aircraft retractable landing gear, a pair of depending struts hinged at their upper ends to spaced apart points on the aircraft, a sleeve slidable and rotatable on one strut articulated to the lower end of the other strut, means operable to move said struts between extended and retracted positions, a landing wheel truck articulated at spaced apart points to said sleeve and to the strut embraced by said sleeve, and means to enforce relative rotation between said sleeve and embraced strut in response to relative axial movement therebetween.

12. In an aircraft retractable landing gear, a pair of depending struts hinged at their upper ends to spaced apart points on the aircraft, a sleeve slidable on one strut articulated to the lower end of the other strut, means operable to move said struts between extended and retracted positions, and a landing wheel truck articulated at spaced apart points to said sleeve and to the strut embraced by said sleeve, one of said wheel truck articulations comprising an elastic shock absorbing mechanism.

13. In an aircraft retractable landing gear, a strut hinged to the aircraft and movable between extended and retracted positions, a wheel truck articulated to the strut, means to turn the truck upon the strut axis in response to landing gear retraction, said means comprising a member guided for rotation about and translation along the strut and a link connecting said sleeve and truck, and means connecting said sleeve to the aircraft at a point on the latter which is spaced from said strut hinge.

I. NEVIN PALLEY.
FRANK ERNEY.